(12) United States Patent
Brown

(10) Patent No.: US 10,736,423 B2
(45) Date of Patent: Aug. 11, 2020

(54) SEATBACK FOR AN ARTICLE OF ADJUSTABLE FURNITURE

(71) Applicant: Paul Daniel Brown, Lancashire (GB)

(72) Inventor: Paul Daniel Brown, Lancashire (GB)

(73) Assignee: HHC CHANGZHOU CORPORATION, Changzhou (CN)

( * ) Notice: Subject to any disclaimer, the term of this patent is extended or adjusted under 35 U.S.C. 154(b) by 0 days.

(21) Appl. No.: 15/625,179

(22) Filed: Jun. 16, 2017

(65) Prior Publication Data
US 2017/0360201 A1    Dec. 21, 2017

(30) Foreign Application Priority Data
Jun. 20, 2016    (GB) .................................. 1610759.1

(51) Int. Cl.
| A47C 7/38 | (2006.01) |
|---|---|
| A47C 1/024 | (2006.01) |
| A47C 7/46 | (2006.01) |
| B60N 2/23 | (2006.01) |
| B60N 2/66 | (2006.01) |

(52) U.S. Cl.
CPC .............. *A47C 1/0242* (2013.01); *A47C 7/38* (2013.01); *A47C 7/462* (2013.01); *B60N 2/23* (2013.01); *B60N 2/66* (2013.01)

(58) Field of Classification Search
CPC .......... A47C 1/0242; A47C 7/38; A47C 7/462
USPC ................ 297/284.1, 284.4, 284.3, 391, 408
See application file for complete search history.

(56) References Cited

U.S. PATENT DOCUMENTS

| 4,162,807 | A   |   | 7/1979  | Yoshimura |             |
|-----------|-----|---|---------|-----------|-------------|
| 5,052,754 | A   | * | 10/1991 | Chinomi   | B60N 2/829  |
|           |     |   |         |           | 297/408     |
| 8,702,173 | B2  | * | 4/2014  | Adams     | A47C 7/38   |
|           |     |   |         |           | 297/403     |
| 9,681,751 | B2  | * | 6/2017  | Lu        | A47C 7/38   |
| 9,730,522 | B2  | * | 8/2017  | Donovan   | A47C 7/38   |
| 9,826,841 | B2  | * | 11/2017 | Donovan   | A47C 7/462  |

(Continued)

FOREIGN PATENT DOCUMENTS

| CN | 2576092   | 10/2003 |
|----|-----------|---------|
| CN | 103007375 | 4/2013  |

(Continued)

*Primary Examiner* — Syed A Islam
(74) *Attorney, Agent, or Firm* — Law Offices of Steven W. Weinrieb

(57) ABSTRACT

The invention concerns a seat back (10) for an article of adjustable furniture comprising: a frame (12), at least one movable support section (14, 80) mounted for angular adjustment with respect to the frame; cam means (64) associated with one of the frame and the movable support section, cam follower means (58) associated with the other of the frame and the movable support section; actuator means (38) for moving said cam means or cam follower means associated with the frame with respect to the frame; whereby movement of said actuator means effects relative movement of said cam means with respect to said cam follower means and said relative movement effects angular adjustment of said support section relative to the frame to alter the seat back configuration. The present invention contemplates embodiments where the support section(s) comprise(s) an adjustable head rest (14), an adjustable lumbar support (80) or both.

21 Claims, 21 Drawing Sheets

(56) References Cited

U.S. PATENT DOCUMENTS

| | | | |
|---|---|---|---|
| 9,949,567 B2* | 4/2018 | Sigmon | A47C 1/02 |
| 2005/0005357 A1* | 1/2005 | Van Raemdonck | A47C 1/024 |
| | | | 5/617 |
| 2006/0097556 A1 | 5/2006 | Jang | |
| 2007/0106188 A1* | 5/2007 | Walker | A61F 5/028 |
| | | | 602/19 |
| 2008/0007105 A1* | 1/2008 | Viger | A47C 7/38 |
| | | | 297/408 |
| 2010/0156161 A1 | 6/2010 | LaPointe et al. | |
| 2012/0086256 A1 | 4/2012 | Adams et al. | |
| 2016/0227933 A1* | 8/2016 | Donovan | A47C 1/02 |
| 2016/0227934 A1* | 8/2016 | Lu | F16H 21/44 |
| 2016/0345740 A1* | 12/2016 | Lu | A47C 7/38 |

FOREIGN PATENT DOCUMENTS

| | | | |
|---|---|---|---|
| CN | 203016364 | 6/2013 | |
| CN | 204120609 | 1/2015 | |
| CN | 204838737 | 12/2015 | |
| DE | 9311520 | 5/1994 | |
| EP | 1525824 | 4/2005 | |
| GB | 2522118 | 7/2015 | |
| GB | 2533217 A * | 6/2016 | A47C 1/0242 |

* cited by examiner

SEATBACK FOR AN ARTICLE OF ADJUSTABLE FURNITURE

This invention relates to a seat back for an article of adjustable furniture such as a recliner chair or the like. In particular the invention concerns a seat back having an adjustable head rest and/or an adjustable lumbar support.

Adjustable chairs are known in which the angle of the seat back (also known as the backrest) can be altered to provide a recline function and/or in which a moveable footrest can be independently moved to a deployed position for lower limb support. Recliner chairs may be manual or powered. In the latter, adjustment is usually achieved by one or more powered actuators, typically electric motors. Some motorised chairs have the ability to lift the chair, or at least the seat section of the chair, to assist the occupant from a seated to a standing position. So called 'zero-wall' recliner chairs have been developed which enable a recliner chair to be positioned with the backrest in close proximity to a wall or other structure and allow the backrest to be reclined without interference with the wall. This can be achieved with the backrest movement being coordinated with the movement of the seat and associated structure the backrest is pivotally connected to. Adjustable beds are also known in which a head support and backrest section of the bed can be moved to adjust the inclination of the backrest.

Contemporary furniture concepts include deep back sofas and chairs where the backrest is set back a significant distance from the front of the sofa or chair to provide a greater seat depth. Low back concepts are also common in contemporary furniture design. Deep back and/or low back designs may include an additional adjustable section in the form of a head rest or neck rest for supporting the occupant more comfortably when the furniture is reclined. In the context of the present invention the terms head rest and neck rest are used interchangeably and do not specifically denote support exclusively of the head or neck of the occupant, but either or both. Similarly where reference is made to "chair" it is to be understood that this not only includes reference to single seat chairs but also multiple seat sofas, other forms of seating that may not be considered to be a chair as such, and chaise lounge or the like.

There is a requirement for a seat back for adjustable furniture which is mechanically less complex than hitherto known designs and which has attendant weight and cost advantages.

According to an aspect of the present invention there is provided a seat back for an article of adjustable furniture comprising: a frame, at least one movable support section mounted for angular adjustment with respect to the frame; cam means associated with one of the frame and the movable support section, cam follower means associated with the other of the frame and the movable support section; actuator means for moving said cam means or cam follower means associated with the frame with respect to the frame; whereby movement of said actuator means effects relative movement of said cam means with respect to said cam follower means and said relative movement effects angular adjustment of said support section relative to the frame to adjust the configuration of the seat back.

The above aspect of the invention provides a simple arrangement for adjustable furniture, particularly adjustable recliner chairs and adjustable beds of the aforementioned type. Mutual engagement of the cam means and cam follower means is readily maintained in all adjustment configurations. This can reduce weight and cost in arrangements of adjustable furniture as less complex structures may be implemented. In particular the above aspect of the invention contemplates embodiments without complex and expensive actuating elements. This aspect of the invention can achieve significant weight and cost advantages without compromising performance and durability. This is a particular consideration in the domestic furniture industry where manufacturing cost is often of critical importance to product success in the marketplace.

A significant advantage of this aspect of the present invention is that in embodiments where the article of furniture is an adjustable recliner chair, the profile of the seat back, that is to say the depth dimension of the seat back from front to rear, can be minimised, and thereby a low profile adjustable seat back can be realised with attendant storage and shipping cost advantages, particularly when compared with hitherto known designs, due to the smaller depth dimension of the assembled seat back and actuation system. Thus the reduced depth dimension readily enables greater number of units to be shipped in a given space, such as an ISO container or the like.

Preferably, the cam means is associated with the movable support section and the cam follower means is associated with the frame. The present invention also contemplates embodiments with the opposite arrangement, that is to say where the cam means is associated with the frame and the cam follower means is associated with the movable support section. However, the former arrangement, as in the illustrated embodiment disclosed herein, has been found to provide for a compact and mechanically efficient actuation system for adjustable furniture, particularly adjustable recliner chairs.

In preferred embodiments the cam means is fixed in relation to the frame. The present invention therefore contemplates embodiments in which the cam means, via the cam follower means, acts directly on the movable support section. In this way complex linkage arrangements can be avoided and the compound effect of manufacturing tolerances minimised.

Preferably, the cam follower means is movably mounted on or with respect to the said frame. In this way the cam follower means can be readily moved with respect to the frame by actuator means secured to the frame.

The cam means preferably comprises a guide ramp. In this way translational movement of the cam follower means readily provides for upwards or downwards movement of the cam means with respect to the frame.

In preferred embodiments the guide ramp comprises an inclined guide.

The guide ramp preferably has a linear inclination. In this way the response of the cam means corresponds to the movement of the cam follower means in a linear relationship. That is to say the upwards or downwards movement of the cam means is directly proportional to the translational movement of the cam follower means relative to the frame.

The guide may have an angle of inclination in the range 20 to 45 degrees, preferably 25 to 35 degrees, most preferably 30 degrees+/−1 degree.

The inclination of the cam means or guide may be determined by the particular geometry of the adjustable seat back and determined by the amount of gearing required for a particular application. For example, the present invention contemplates embodiments where the actuator means comprises an electrical linear actuator of known type having a specific power rating, maximum loading, range of linear movement and linear velocity (speed). In the present invention the angle of inclination of the guide may be selected based on the known performance characteristics of the electrical linear actuator to be used. The effective gearing provided by the angle of inclination may be selected based on the actuator performance characteristics and the required rate of motion (rotational velocity) of the respective movable support section with respect to the frame. By altering the angle of inclination of the guide, the performance characteristics of a known actuator can be best matched to the desired motion characteristics of the movable support section of the article of furniture.

The cam means is preferably fixed in relation to a moving part of the actuator means. In this way movement of the cam means is directly related to movement of the actuator.

The actuator means preferably comprises a linear actuator arranged to move said cam follower means in the longitudinal direction of the frame. The present invention therefore contemplates embodiments where commercially available linear actuators can be utilised.

Preferably, the cam means is fixed in relation to a cam follower support element fixed in relation to the movable support section. This provides for a compact mechanical arrangement on the underside of the adjustable support section so it can be positioned closely adjacent to the frame.

In preferred embodiments the guide means is linear, preferably inclined, most preferably inclined in a forward direction towards a toe end of the bed.

In preferred embodiments, the frame comprises first and second spaced apart parallel side frame members. This provides for a robust construction and which is preferably in the form of a rectangular structural frame.

In preferred embodiments actuator means is arranged to apply the adjustment force substantially to an underside of the moveable support section to which it is associated with. In this way the actuator loads may be minimised by increasing the perpendicular distance between the pivot axis of the respective support section and the point of application of actuator load.

In preferred embodiments, at least one movable support section is/are pivotally mounted for angular adjustment with respect to said frame.

In preferred embodiments, the at least one movable support section comprises an adjustable lumbar support.

In preferred embodiments, the at least one movable support section comprises an adjustable head rest.

In the context of the present invention the terms head rest and neck rest are used interchangeably.

In preferred embodiments, the at least one movable support section comprises an adjustable lumbar support and an adjustable head rest.

Thus the present invention contemplates embodiments where the seat back has an adjustable headrest, a seat back that has an adjustable lumbar support and a seat back that has both an adjustable head rest and an adjustable lumbar support.

In preferred embodiments, actuator means, preferably a linear actuator, is associated with each of the relatively moveable support sections so that each may be operated independently or in co-ordination with the other. In preferred embodiments, the actuator means comprises first and second actuators. A first actuator may be provided for independent movement of the adjustable head rest, and a second actuator may be provided for independent movement of the adjustable lumbar support.

In preferred embodiments, the first and second actuators are arranged side by side on the seat back frame.

Various embodiments of the present invention will now be more particularly described, by way of example only, with reference to the accompanying drawings; in which.

Figure 1:
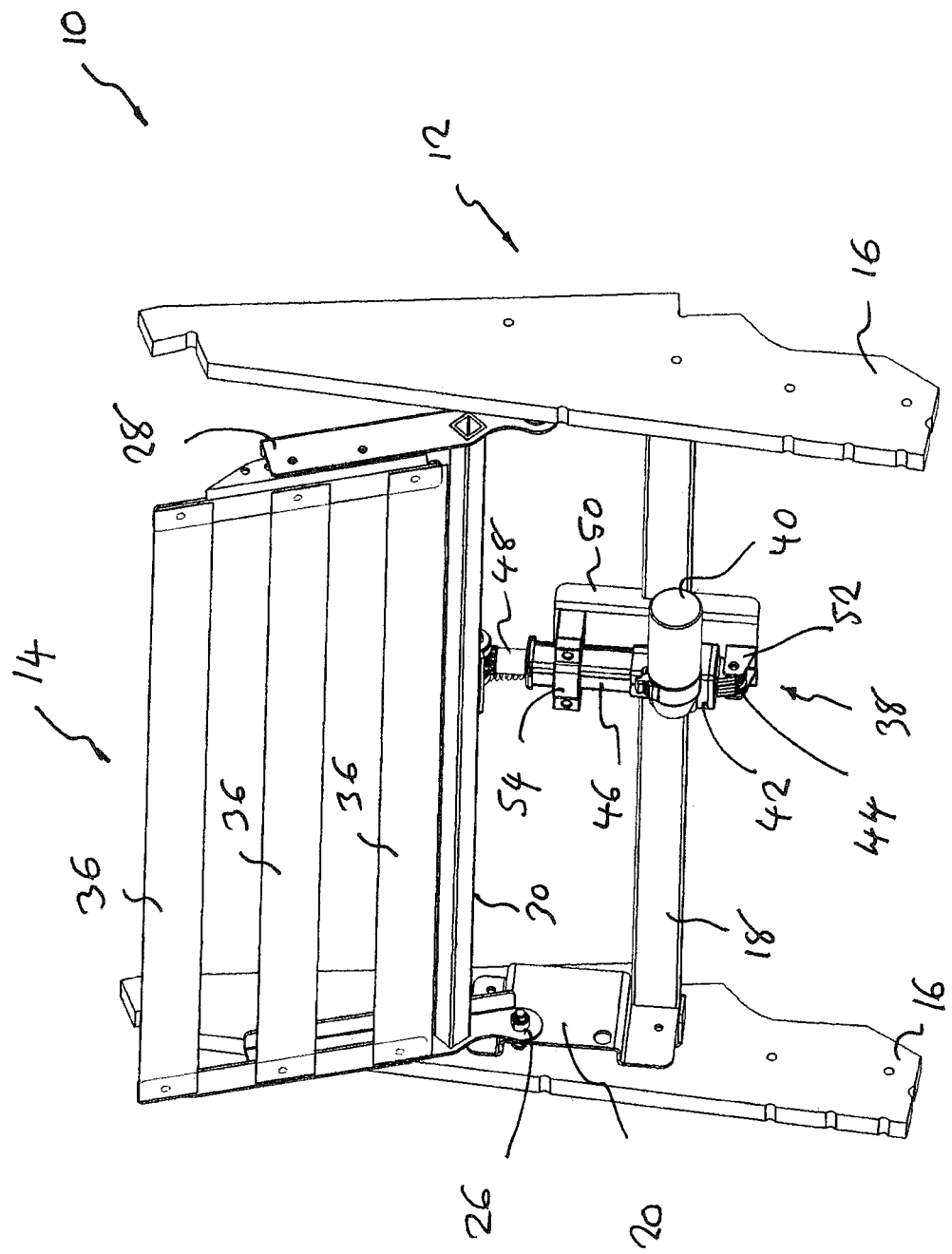
FIG. 1 is a perspective view from the front of a seat back frame and operating mechanism for a recliner chair having an adjustable head rest according to an embodiment of the present invention.
Figure 2:
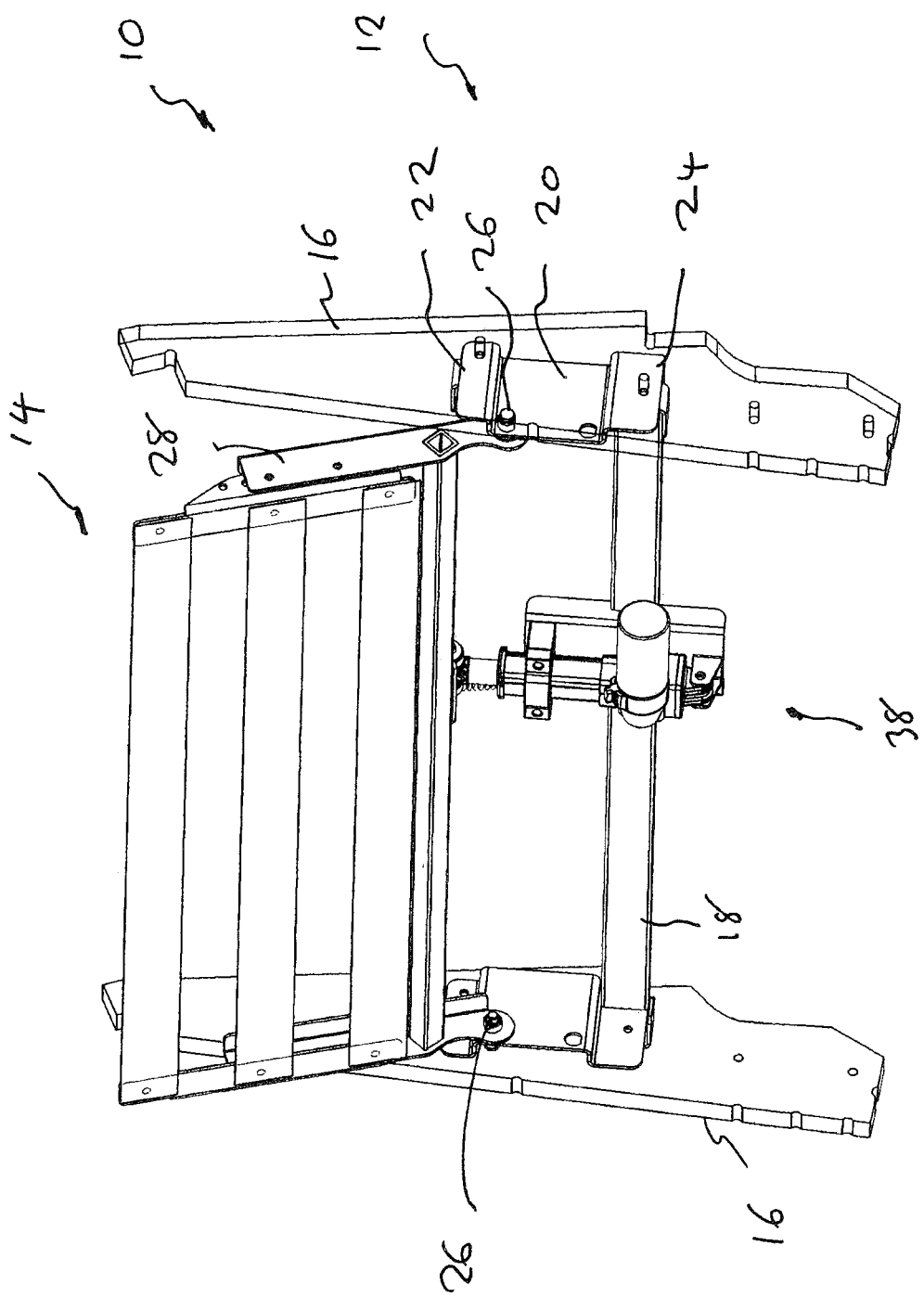
FIG. 2 is the same as FIG. 1, with the right hand panel of the seat back frame shown in ghost outline.
Figure 3:
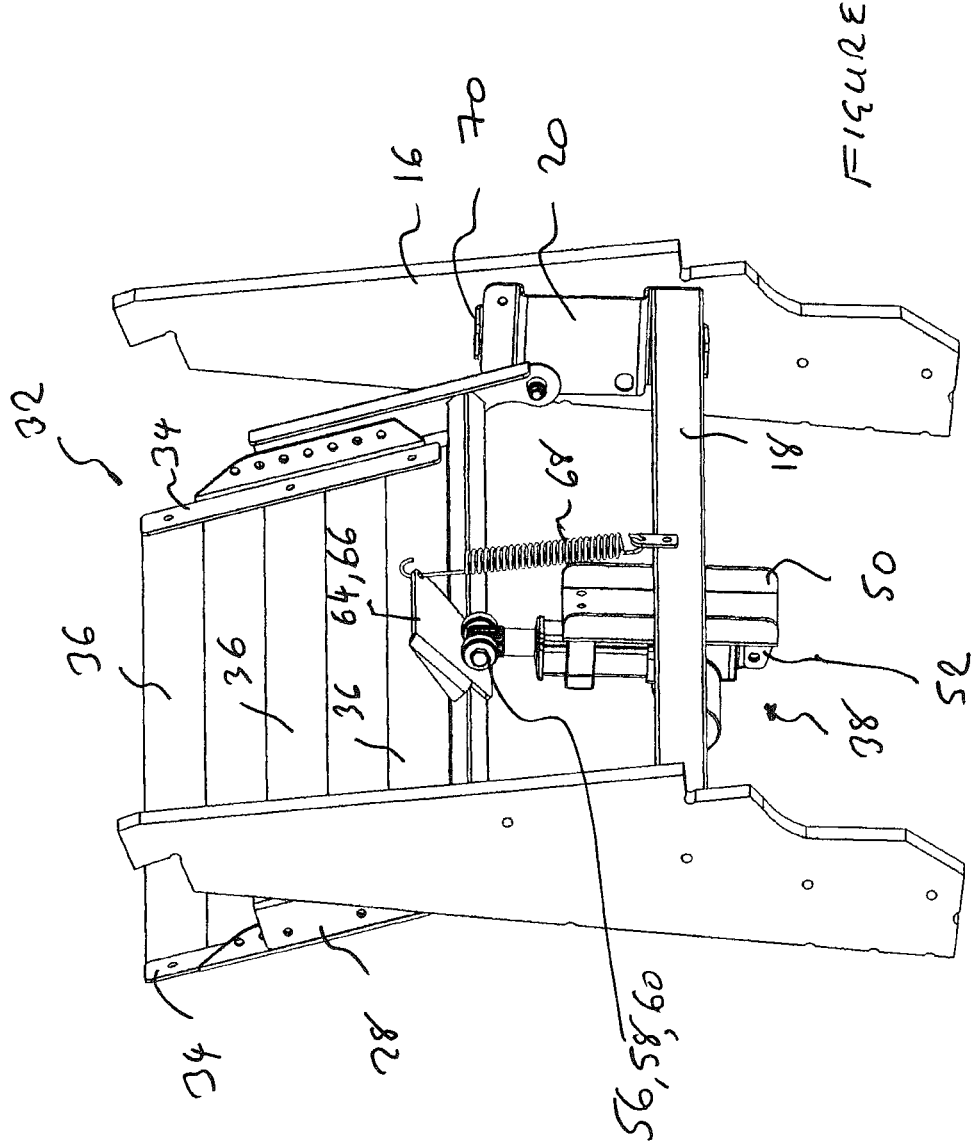
FIG. 3 is a perspective view from the rear of the seat back frame and operating mechanism of FIG. 1.
Figure 4:
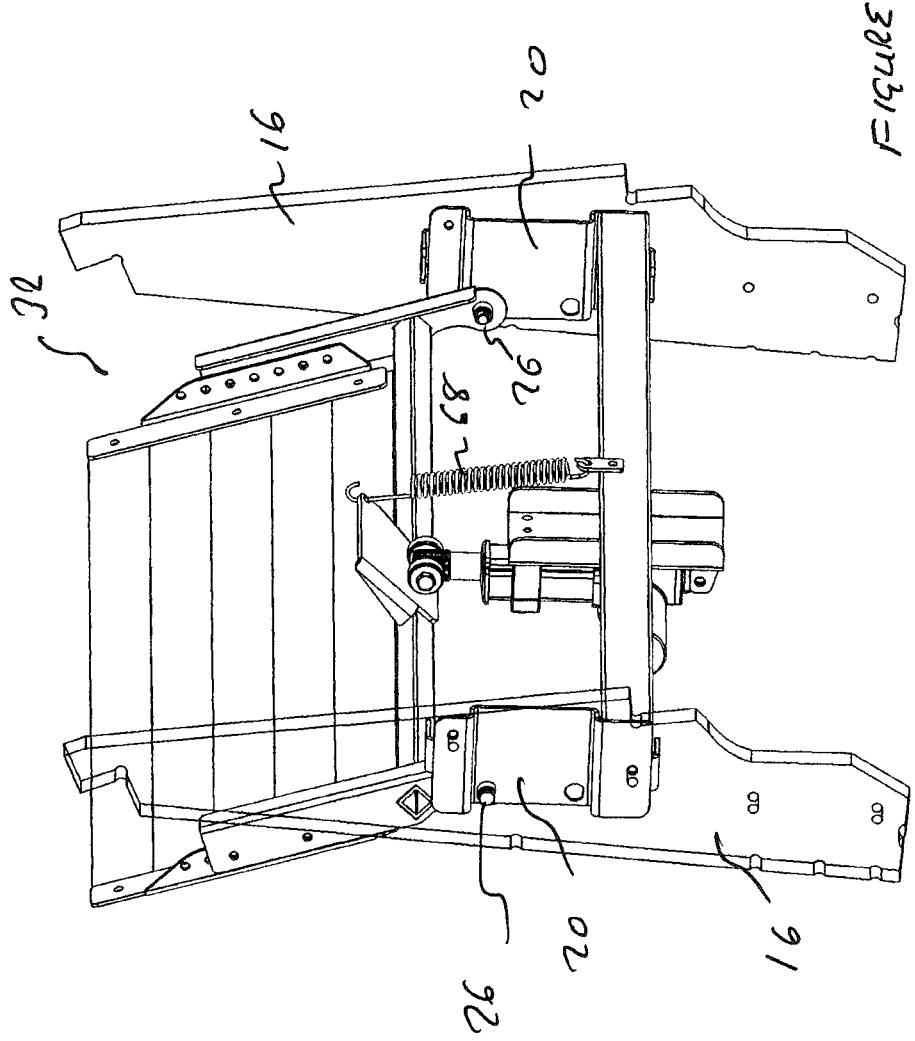
FIG. 4 is the same as FIG. 3, with the right hand panel of the seat back frame shown in ghost outline.
Figure 5:
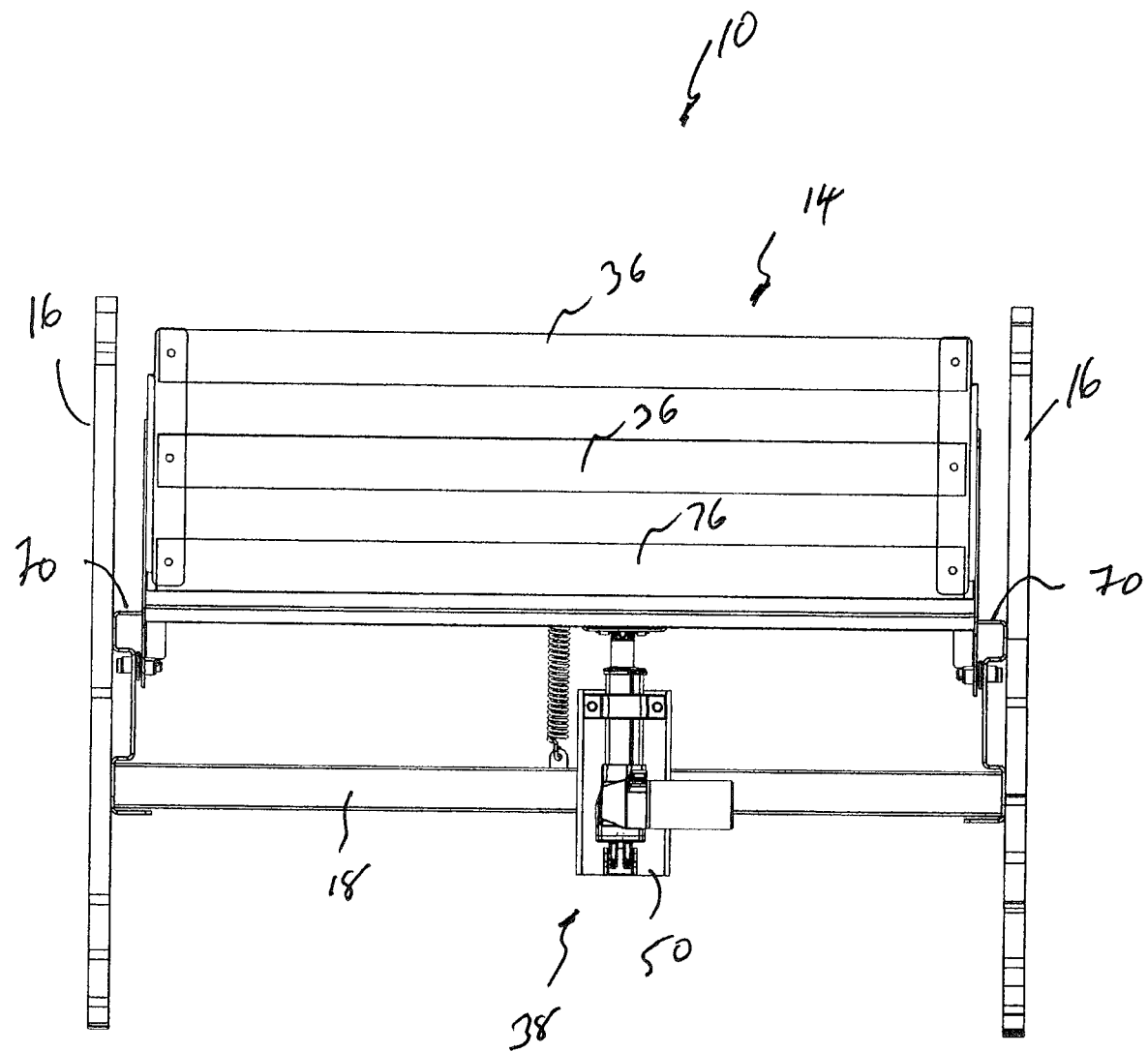
FIG. 5 is a rear elevation view of the seat back frame and operating mechanism of FIG. 1.
Figure 6:
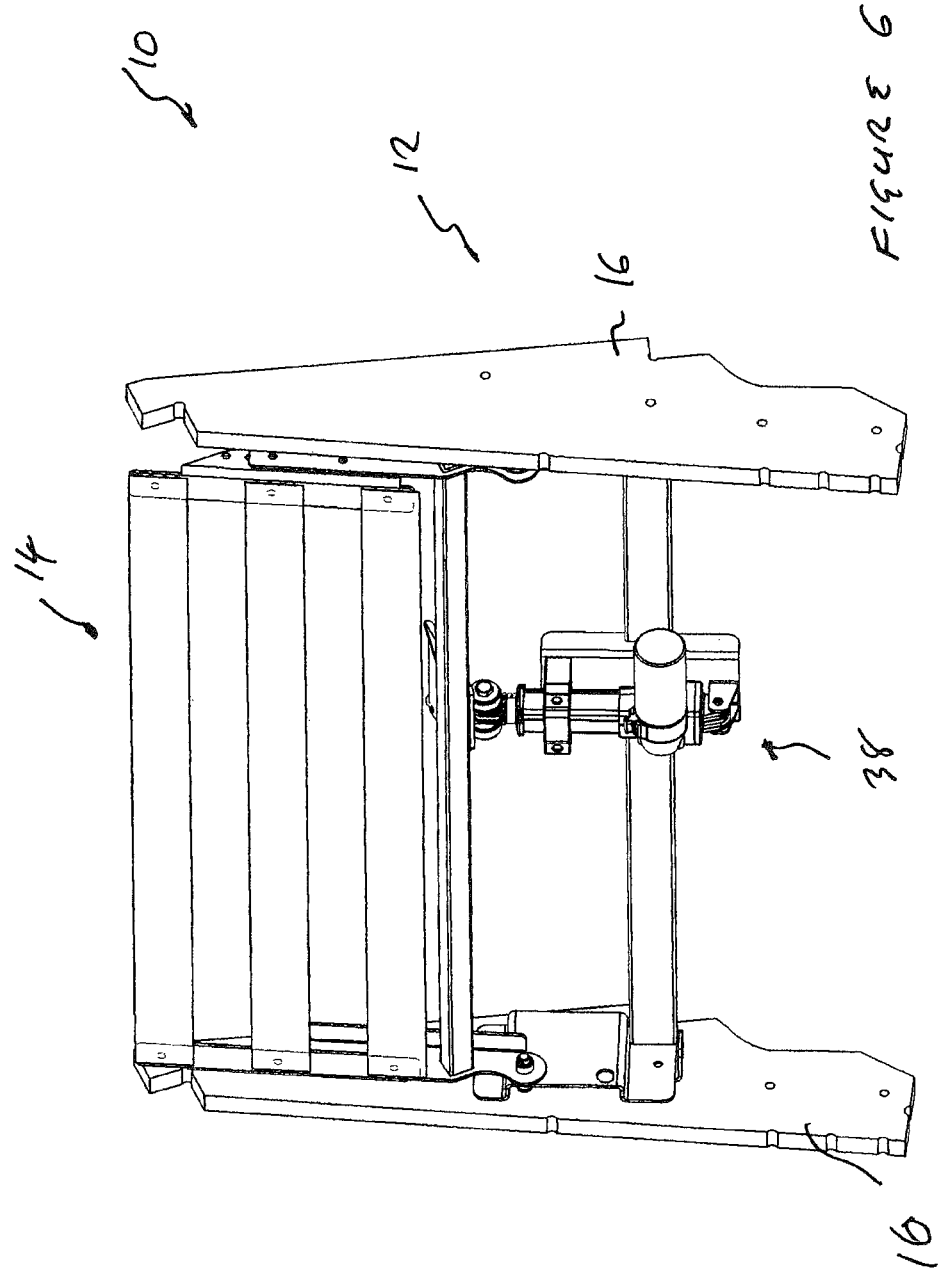
Figure 7:
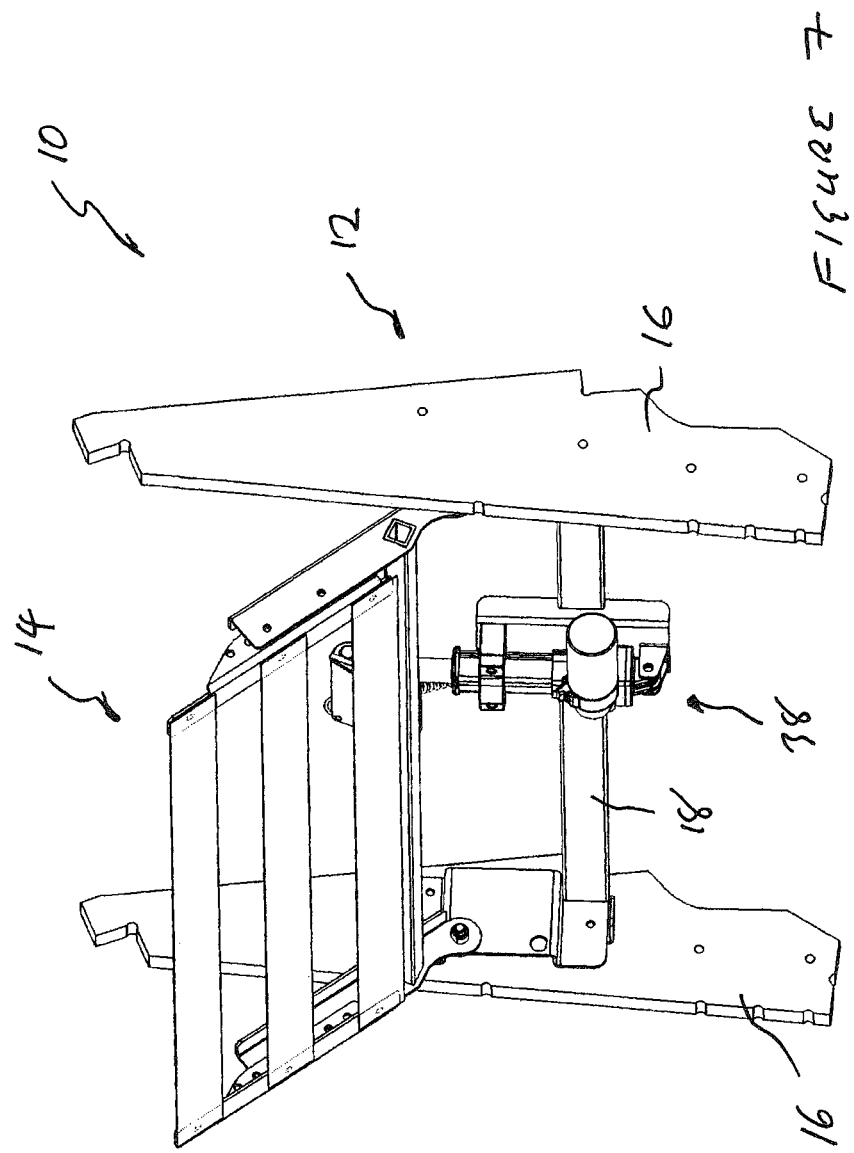
Figure 8:
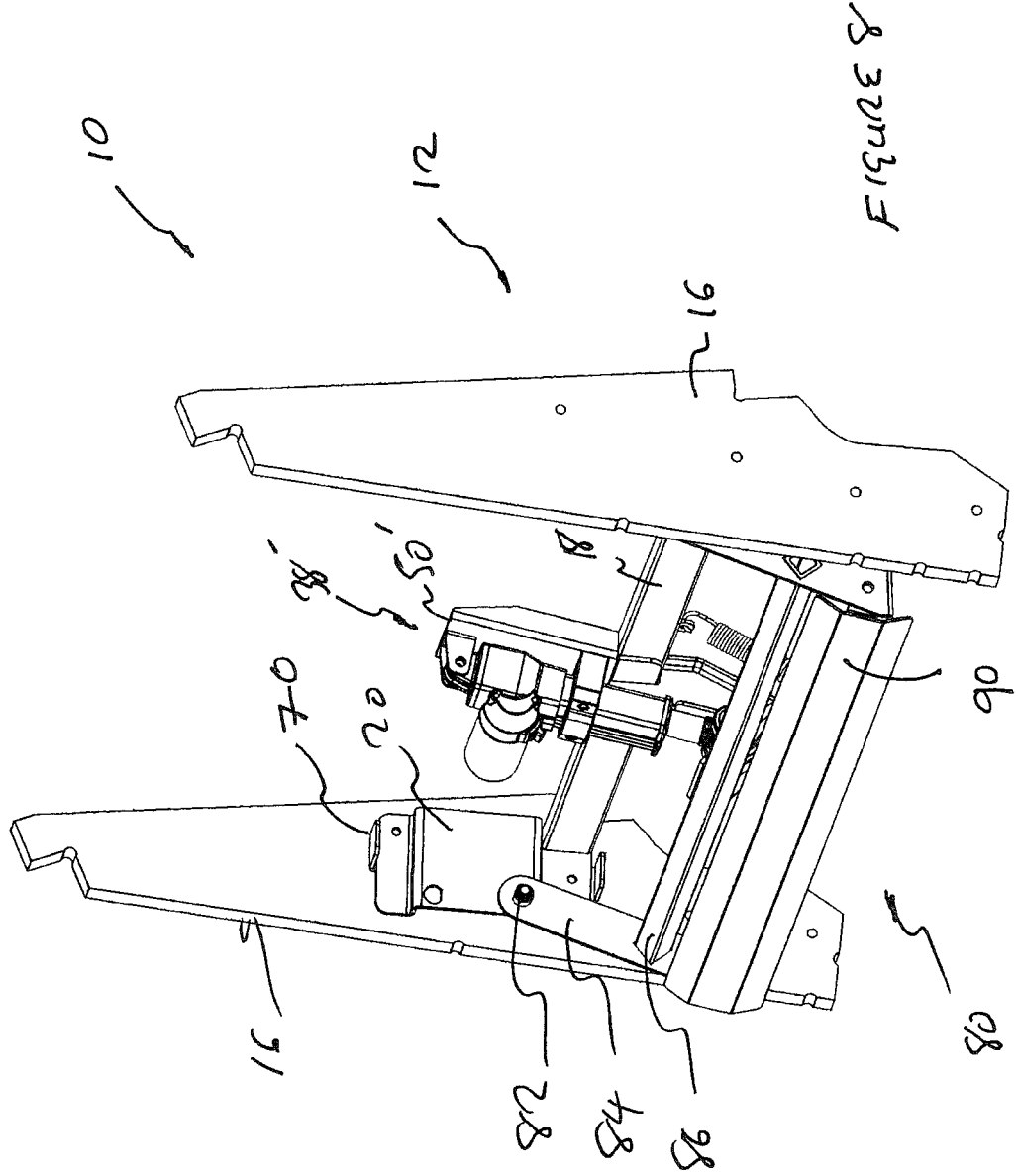
Figure 9:
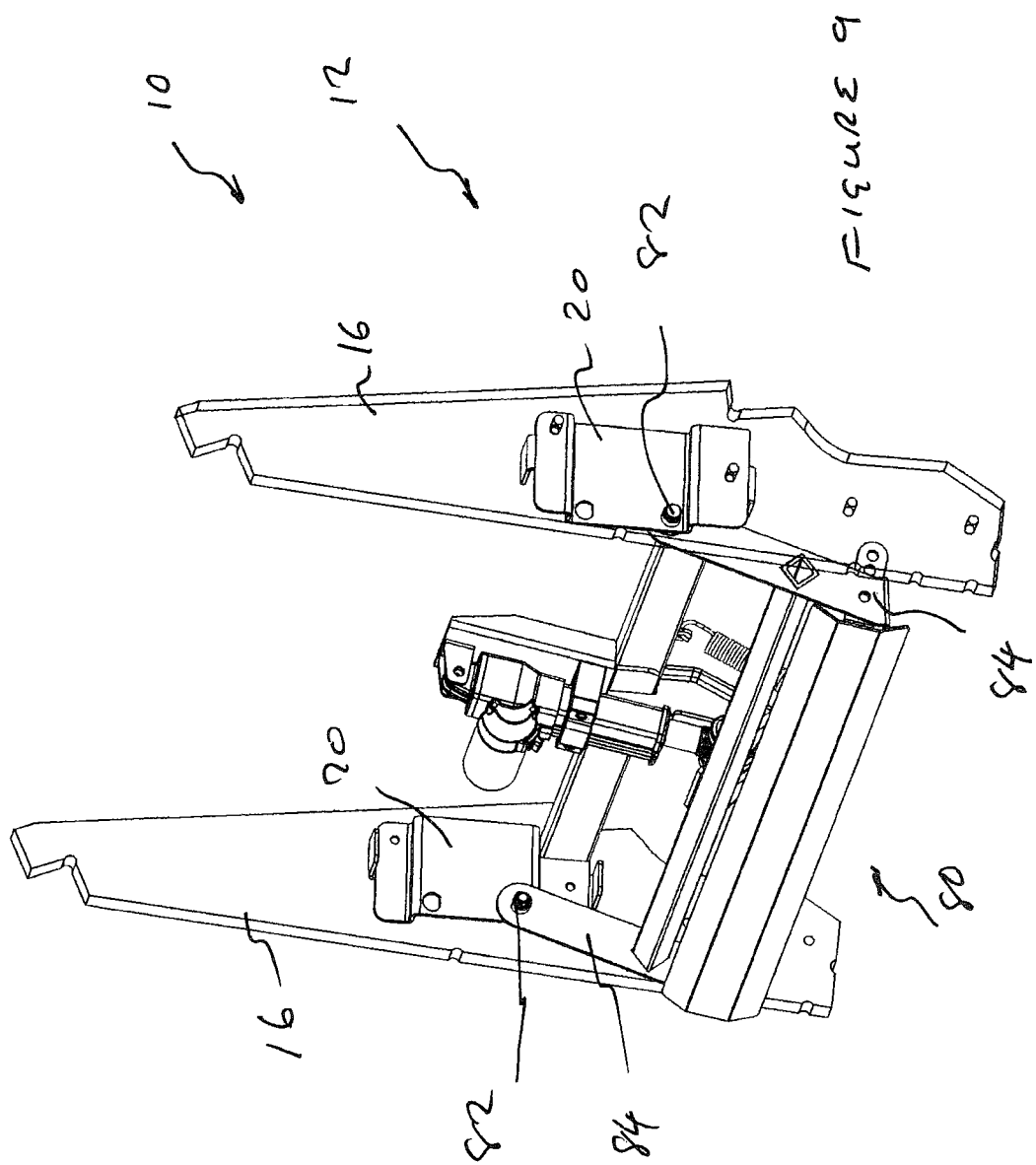
Figure 10:
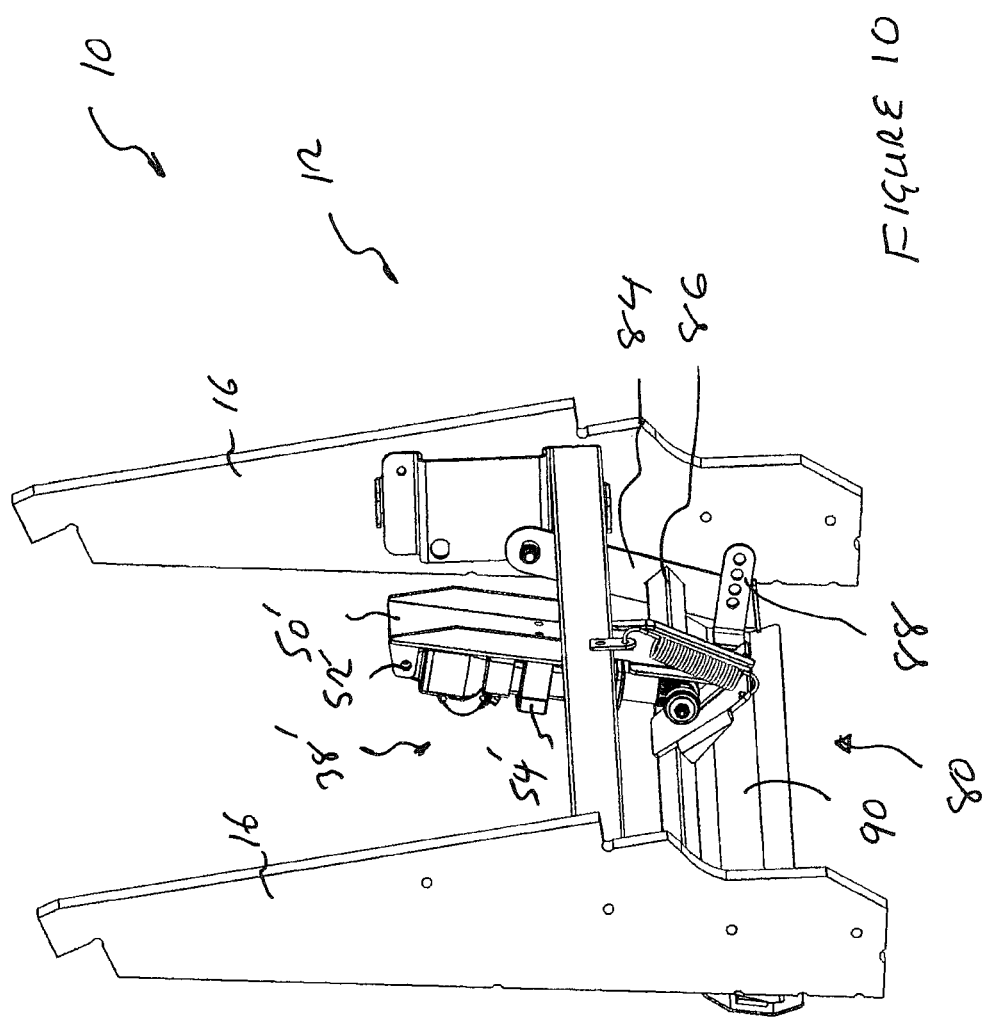
Figure 11:
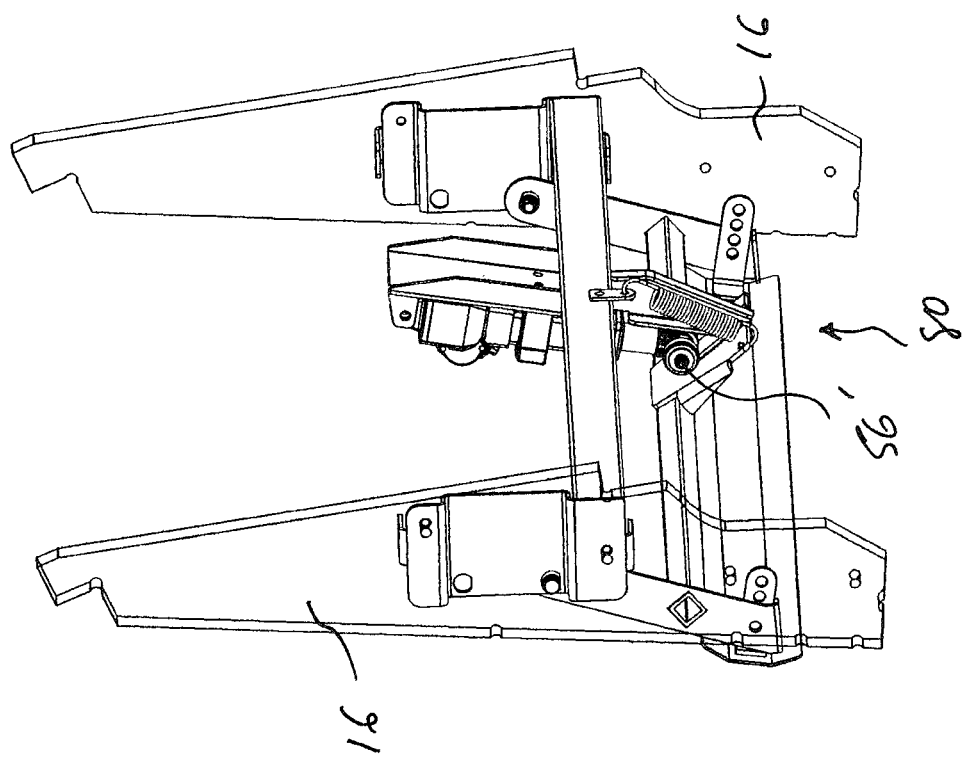
Figure 12:
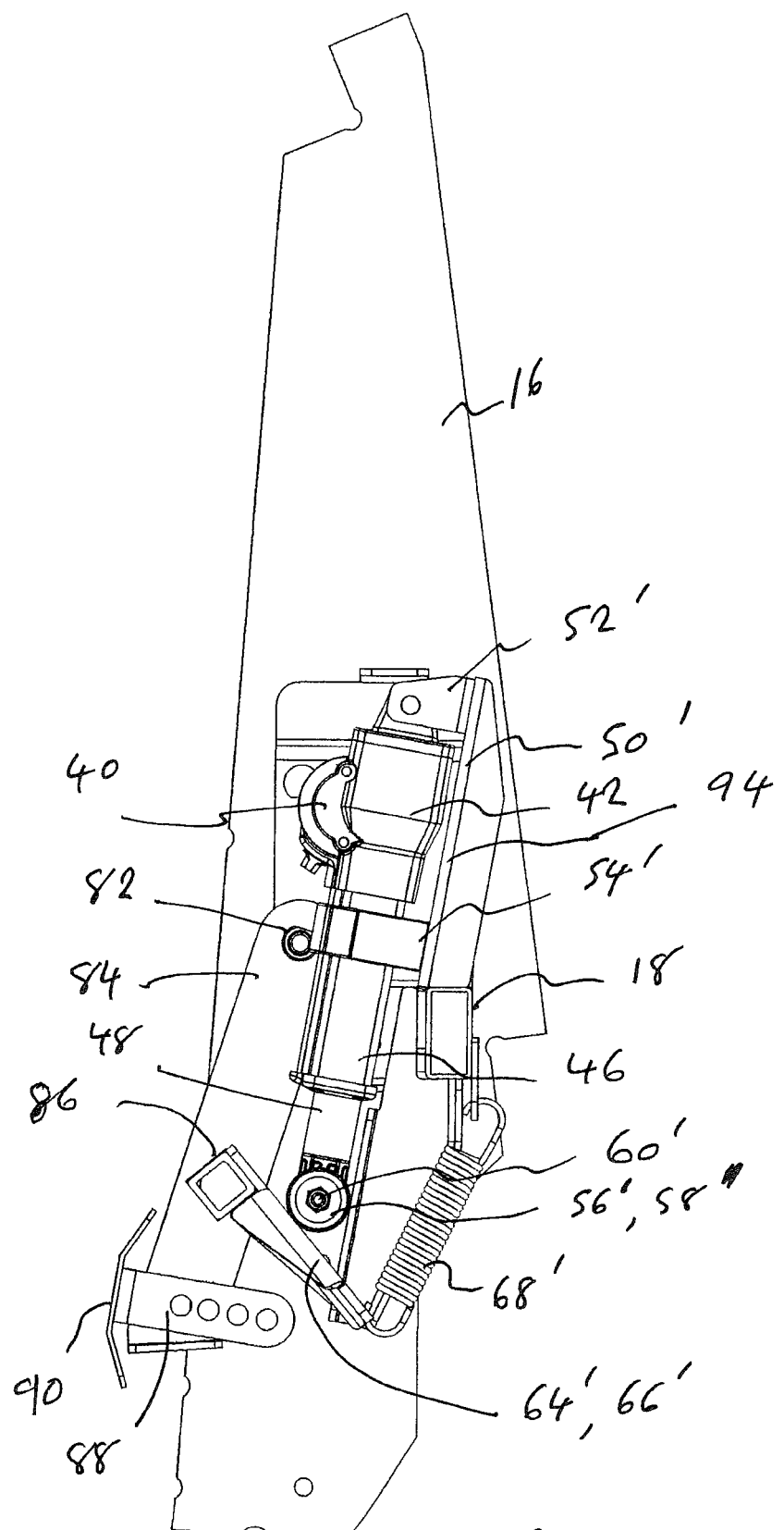
Figure 13:
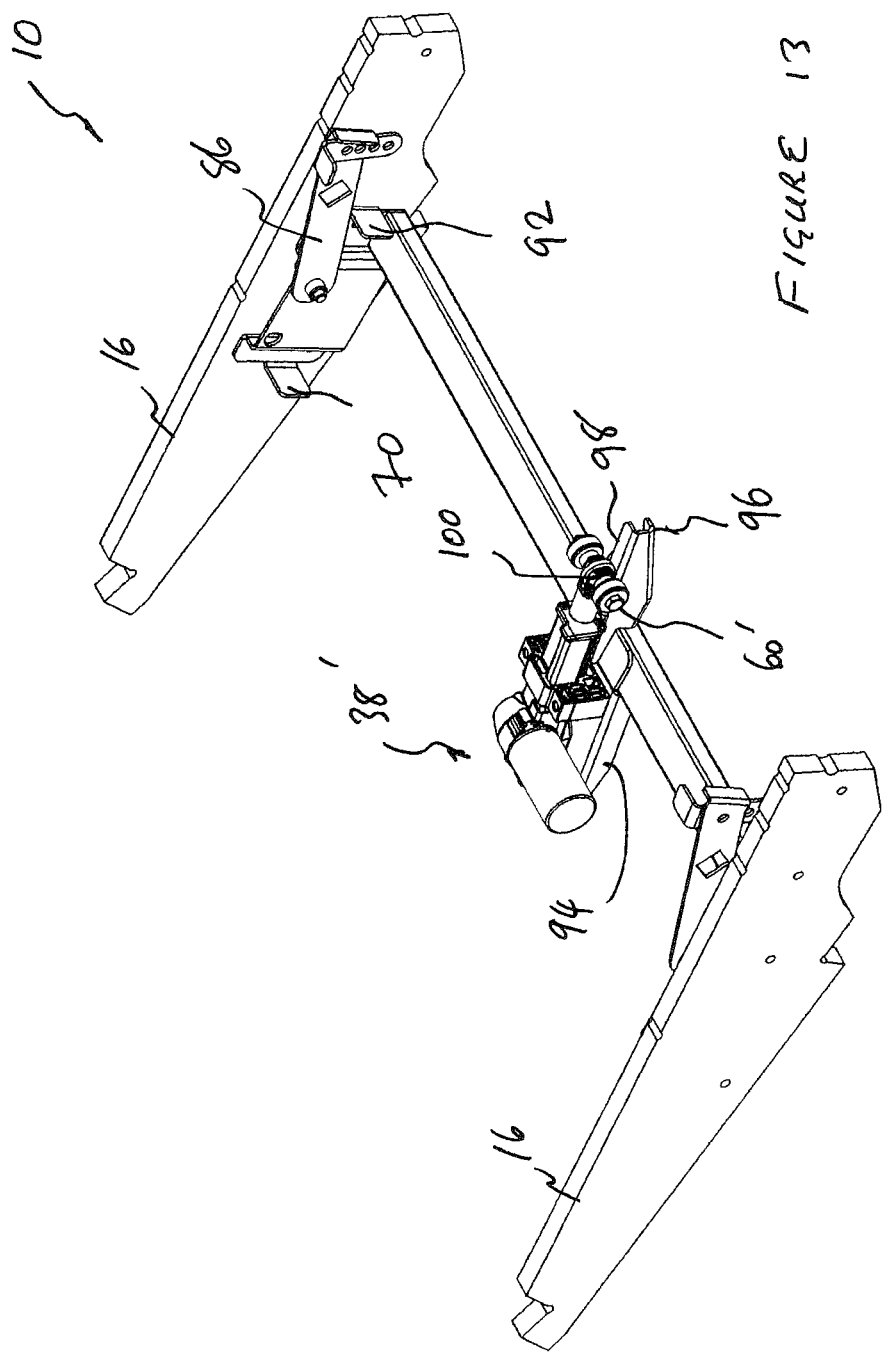
Figure 14:
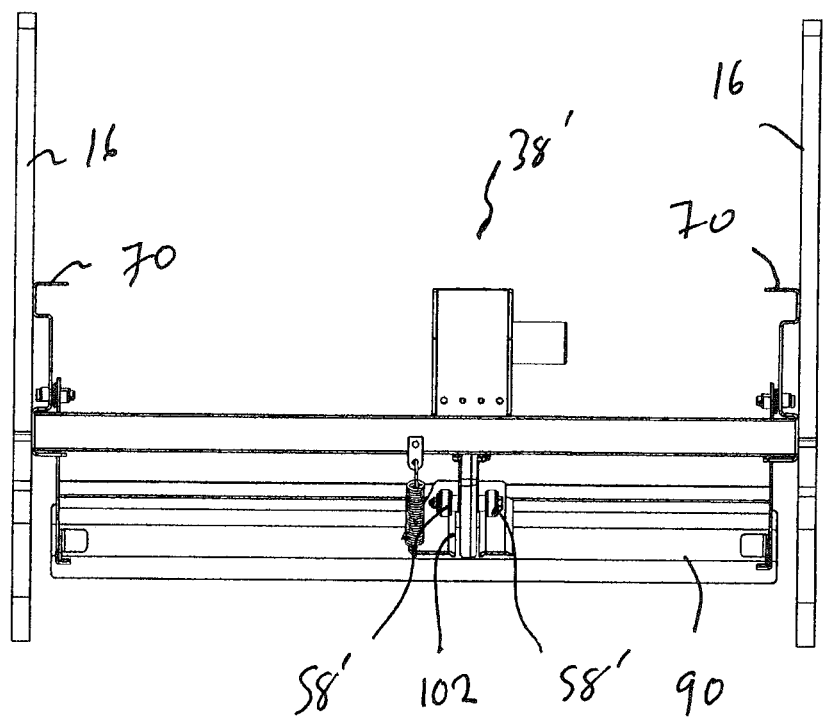
Figure 15:
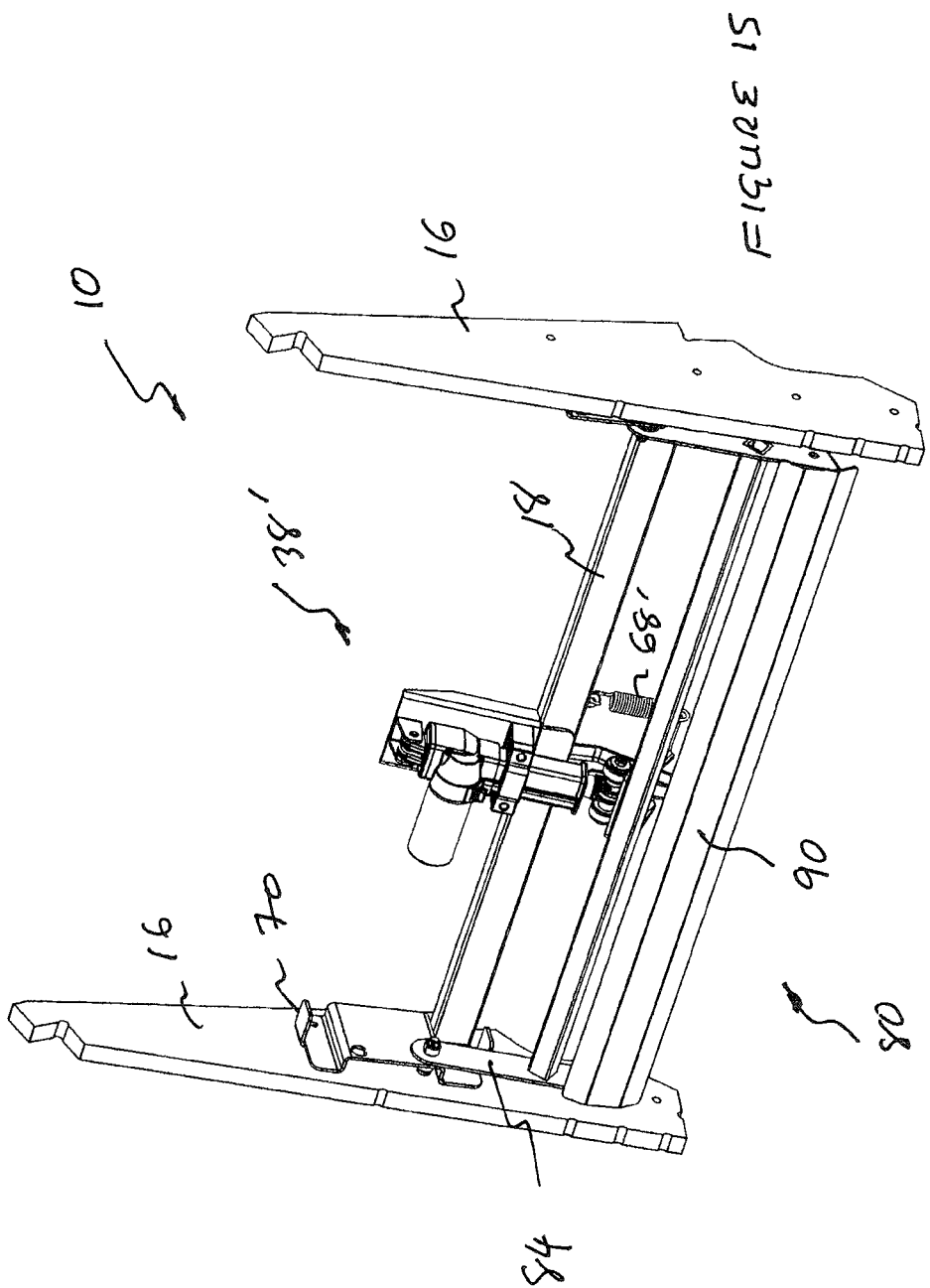
Figure 16:
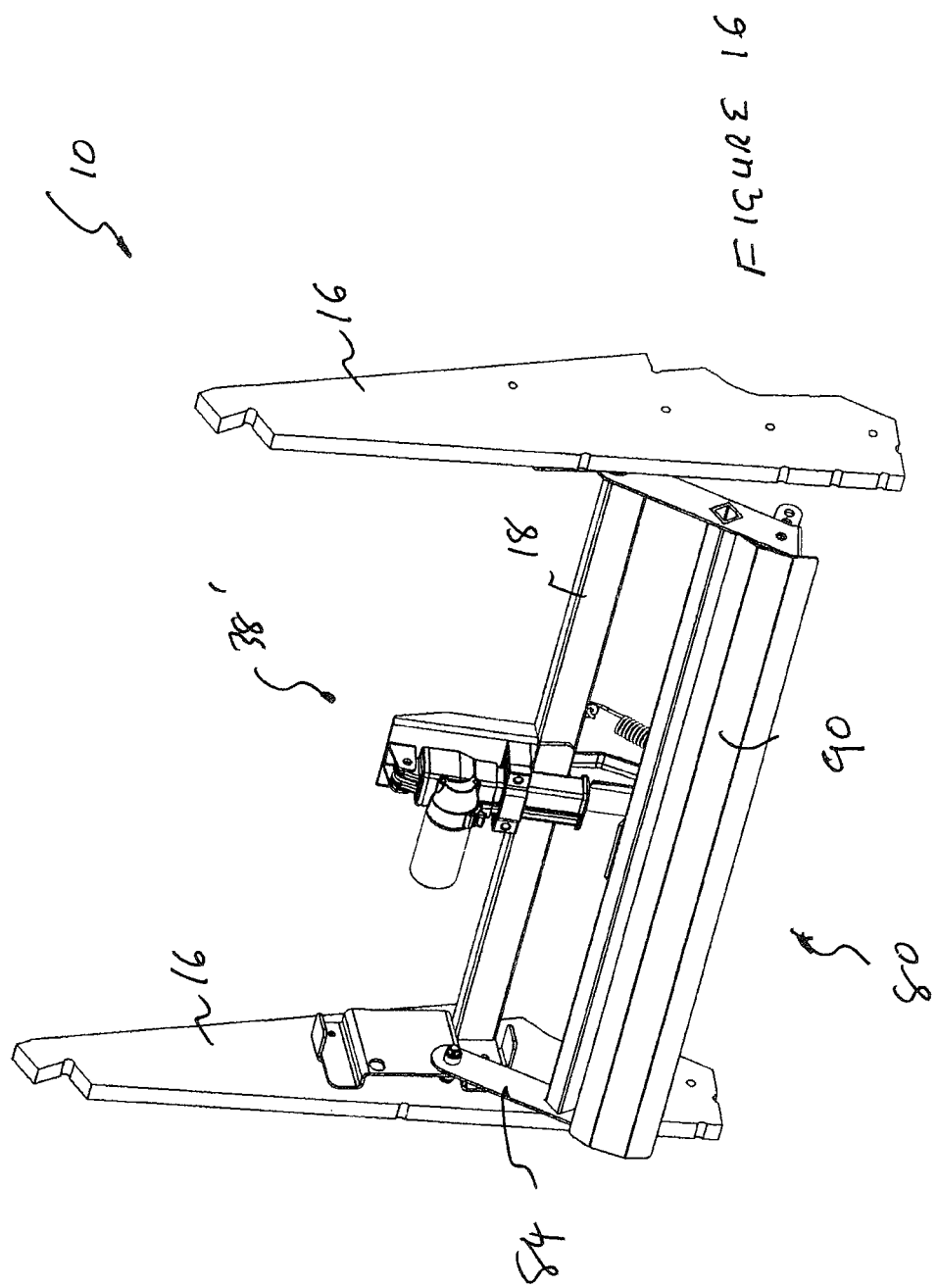
Figure 17:
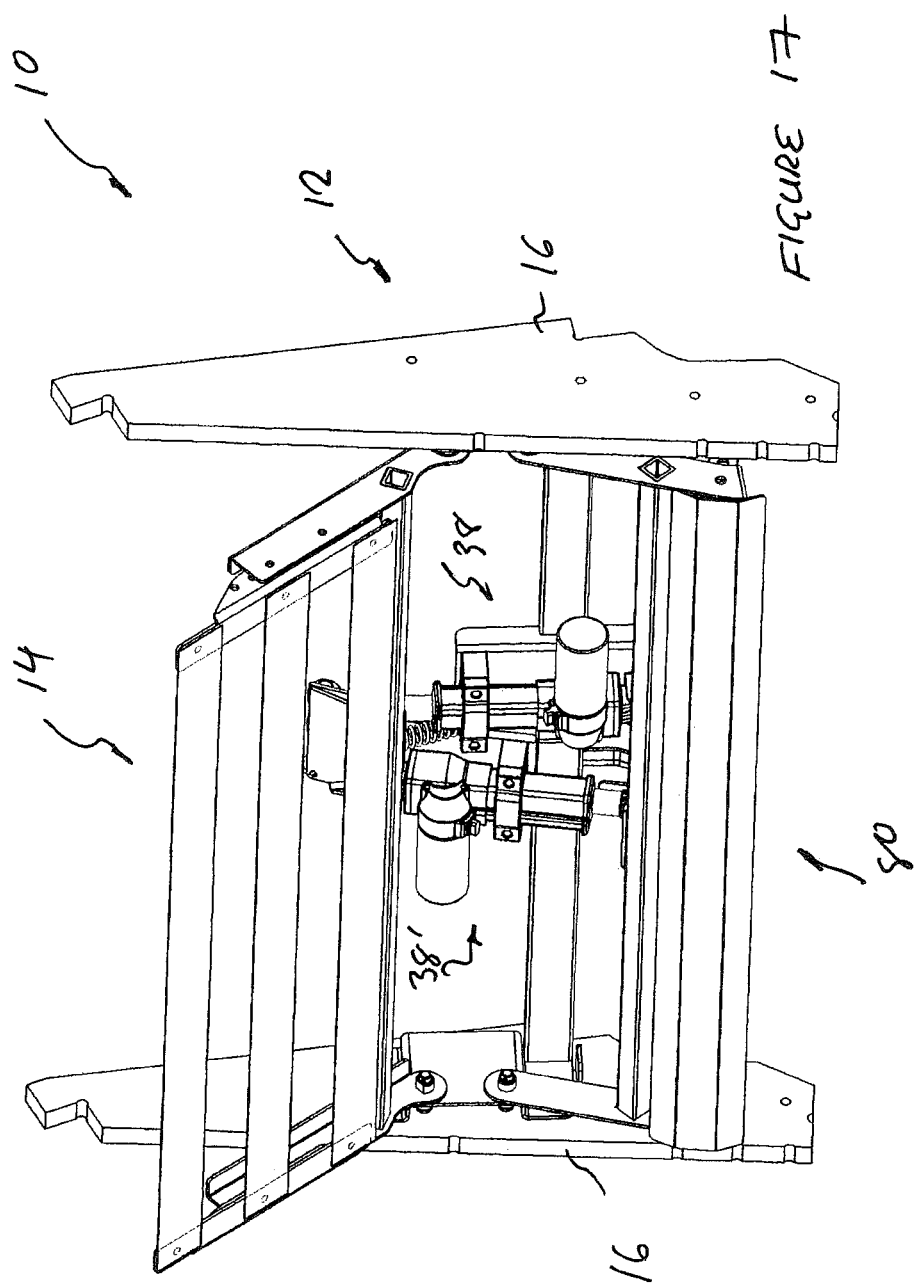
Figure 18:
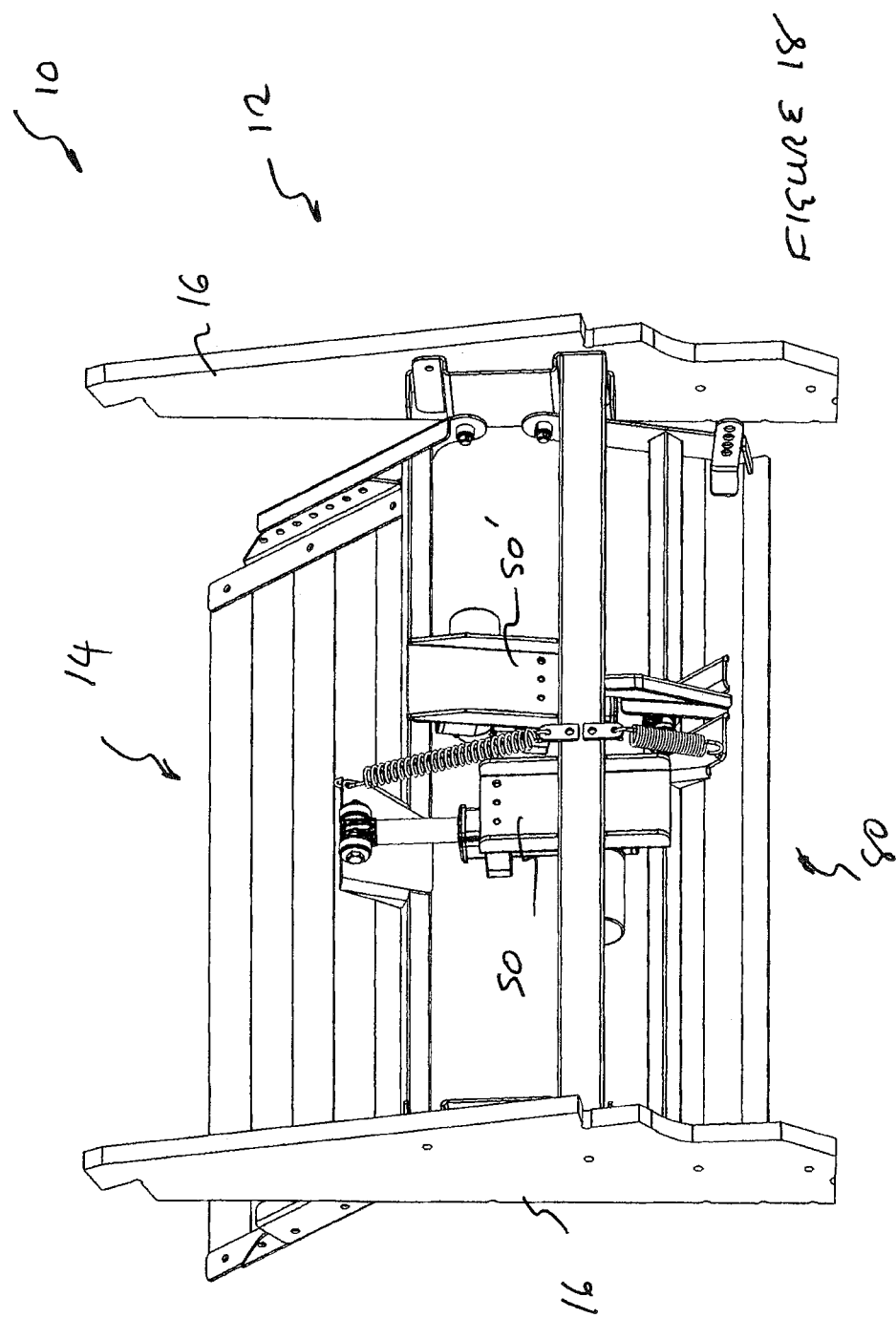
Figure 19:
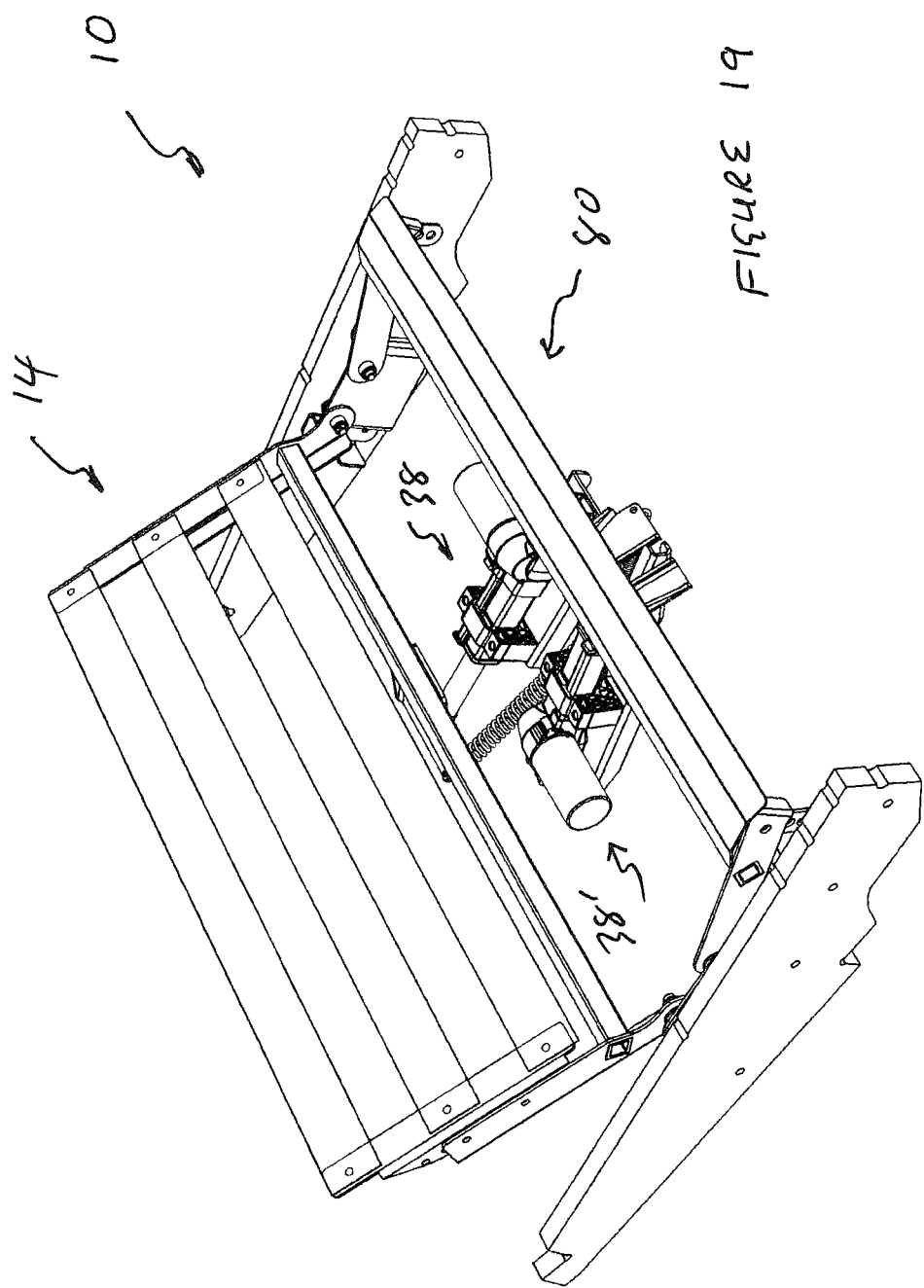
Figure 20:
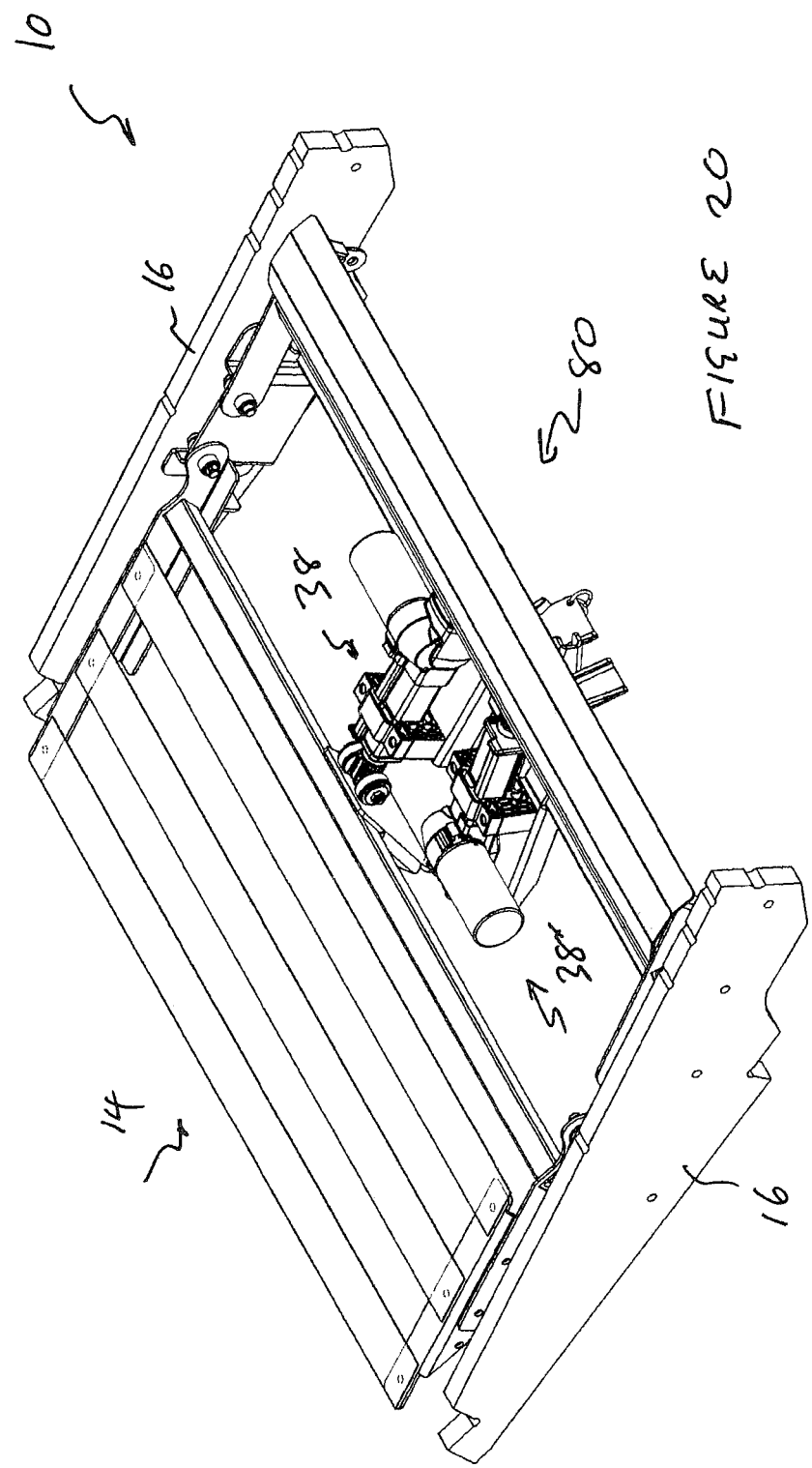
Figure 21:
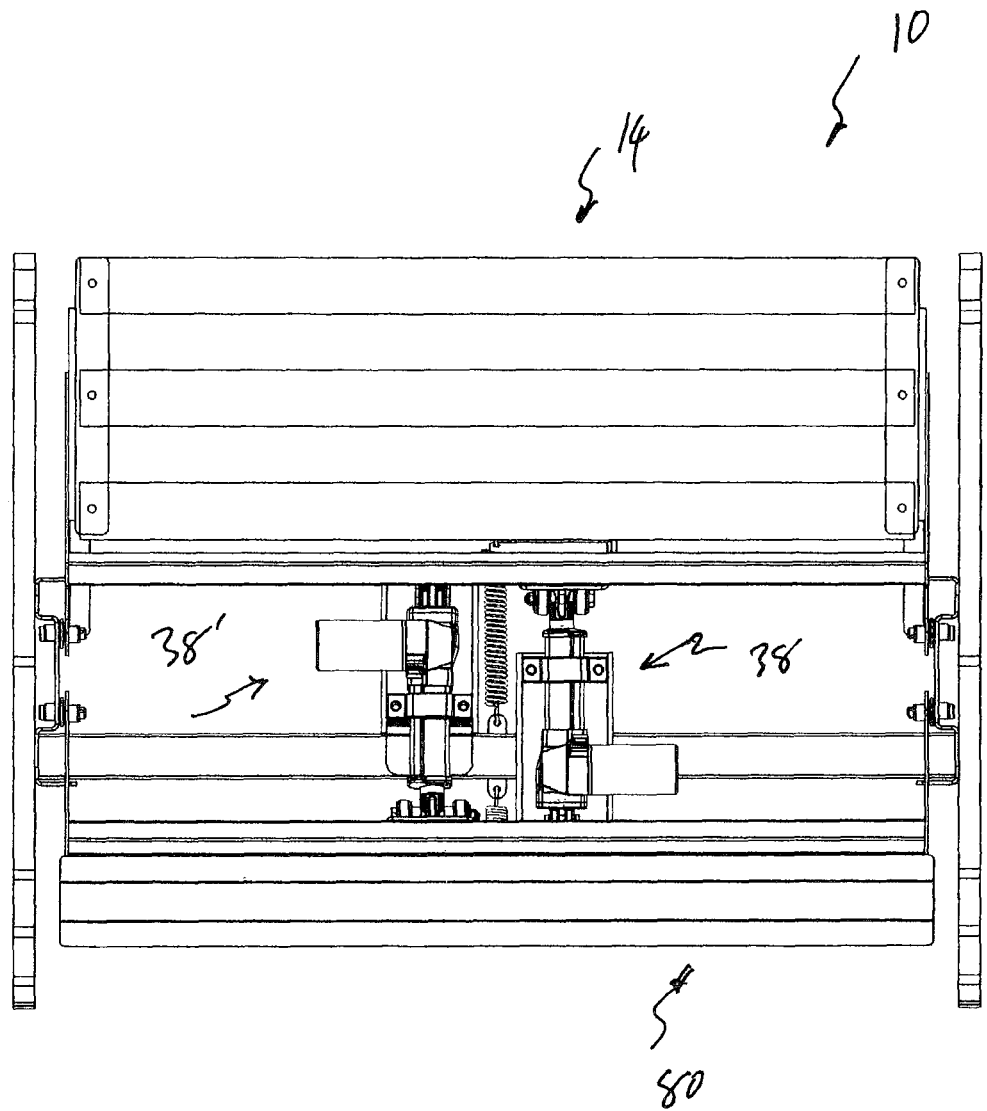

In FIGS. 1 to 5 exclusively the adjustable head rest is shown in a partially extended position;

FIG. 6 is a perspective view similar to FIG. 1, with the head rest fully retracted;

FIG. 7 is a perspective view similar to FIG. 1, with the head rest fully extended;

FIG. 8 is a perspective view from the front of a seat back frame and operating mechanism for a recliner chair having an adjustable lumbar support according to an embodiment of the present invention;

FIG. 9 is the same as FIG. 8, with the right hand panel of the seat back frame shown in ghost outline;

FIG. 10 is a perspective view from the rear of the seat back frame and operating mechanism of FIG. 8;

FIG. 11 is the same as FIG. 10, with the right hand panel of the seat back frame shown in ghost outline;

FIG. 12 is a cross-section view of the seat back frame of FIG. 8;

FIG. 13 is a perspective view of the seat back frame of FIG. 8 with various components of the lumbar support removed;

FIG. 14 is a rear elevation view of the seat back frame and operating mechanism of FIG. 8;

In FIGS. 8 to 14 exclusively, the adjustable lumbar support is shown in a partially extended position;

FIG. 15 is a perspective view similar to FIG. 8, with the lumbar support fully retracted;

FIG. 16 is a perspective view similar to FIG. 1, with the lumbar support fully extended;

FIG. 17 is a perspective view from the front of a seat back frame and operating mechanism for a recliner chair having an adjustable head rest and an adjustable lumbar support according to a further embodiment of the present invention;

FIG. 18 is a perspective view from the rear of the seat back frame and operating mechanism of FIG. 17;

FIG. 19 is a perspective view from above of the seat back frame and operating mechanism of FIG. 17;

FIG. 20 is a perspective view similar to FIG. 19, with the head rest and lumbar support fully retracted;

FIG. 21 is a front elevation view of the seat back frame of FIG. 17, with the head rest and lumbar support fully retracted;

In the drawings of FIGS. 1 to 21, same and similar reference numbers designate same and similar parts.

Referring to the drawings of FIGS. 1 to 7, a seat back 10 for a recliner chair comprises a frame 12, adjustable headrest 14 and an operating mechanism for adjusting the position of the headrest with respect to the frame. In the drawings of FIGS. 1 to 7 the headrest is shown partially deployed at an intermediate position between a fully closed position (FIG. 6) and a fully open adjusted position (FIG. 7). The adjustable headrest may be considered to be a movable support section of the seat back 10.

The frame 12, which may be considered to be a first furniture component, comprises a pair of generally planar side frame members 16, preferably of wood or fibre board construction. The side frame members are arranged on opposite lateral sides of the frame and are fixedly secured together by means of a tubular cross-member 18, preferably of metal construction, which extends horizontally between the side frame members. The cross-member is attached to the side frame members by means of respective metal mounting brackets 20. The mounting brackets are fixedly secured to the inward facing surfaces of the respective said frame members at a position approximately midway along their length. The cross-member 18 and mounting brackets 20 may be joined together by welding or other means including fixing means such as screws, fasteners or the like.

The mounting brackets 20 have a generally U-shape cross-section with respective upper and lower mounting flanges 22, 24 at the ends of the U for fixedly securing the brackets to the inward facing surfaces of the side frame members, for example by means of suitable fastening means such as screws or the like. The U-shape cross-section of the mounting brackets provides a gap between the bottom of the bracket and the respective side frame member to accommodate a mounting pin 26 of the headrest. Mounting pins 26 rotatably mount the headrest with respect to the frame, between the side frame members 16, about a pivot axis defined by the pins.

The headrest 14, which may be considered to be a second furniture component, comprises a pair of elongate side members 28, preferably of metal, disposed on opposite lateral sides of the headrest. The side frame members 28 have a generally L-shape cross-section and are fixedly secured together by means of a tubular cross-member 30, preferably of metal construction, which extends horizontally between the side frame members 28. Cross-member 30 is fixedly attached towards the lower end of the respective side frame members 28 by welding or suitable fixing means. The head rest 14 further comprises an inner frame 32 attached to the respective side frame members. The inner frame 32 comprises a pair of elongate side frame members 34 fixedly secured to the outer frame side frame members 28, and a plurality of resilient support straps 36 which extend horizontally between the side frame members 34 and secured thereto by suitable fixing means. The support straps are preferably of a webbing type material well known to those in the upholstered furniture industry.

The position of the inner frame 32 relative to the side frame members 28 is adjustable along the length of the side frame members to allow manufacturing flexibility, that is to say, when the headrest is being manufactured the inner frame may be positioned and secured at one of a number of discrete mounting positions on the side frame members 28, depending on the requirements of a particular application/design.

An electrical linear actuator 38 is provided for moving the headrest 14 with respect to the frame 12 about its pivot axis. The actuator is of a known type having a low voltage DC motor 40, a gearbox 42, mounting clevis 44, outer tube or snout 46 and extendable ram 48. The actuator 38 is fixedly secured to the cross-member 18 by means of a rigid rectangular mounting plate 50, preferably of metal construction, and first and second actuator mounting brackets 52, 54 which fixedly secure the actuator to the mounting plate. The first mounting bracket 52 secures the motor end of the actuator to the mounting plate at clevis 44. The second mounting bracket 54 secures the snout 46 of the actuator to the mounting plate at the other end of the mounting plate. The second mounting bracket clamps the snout 46 of the actuator to the mounting plate. This ensures there is no operational movement of the actuator other than the ram in use. The actuator 38 is not free to rotate on its mountings 52, 54.

The distal end of the ram is provided with a cam follower 56 in the form of two adjacent roller bearings 58 rotatably mounted on a common shaft or pin 60 secured to a clevis mounting 62 at the distal end of the ram 48. The cam follower engages a cam 64 in the form of a metal plate 66 which extends rearwards and upwards from the rear of the cross-member 30. The angle of the metal plate 66 with respect to the notional plane of the headrest 14 is determined by the amount of headrest adjustment required per unit of extension of the actuator ram. That is to say the angle of the plate 66, with respect to the plane of the headrest, determines the gearing of the actuator and operating mechanism of the headrest. A shallow angle would provide low gearing. A higher angle, but less than 90 degrees, would provide high gearing.

It is to be understood that as the actuator is extended, in use, the cam follower rollers 58 engage the under surface of the angled cam plate 66 and cause the head rest to rotate about its pivot axis form its retracted position of FIG. 6 to is fully extended position of FIG. 7. The maximum angle of adjustment of the headrest about its pivot axis is typically 25-55 degrees, for example.

It is preferred that actuator 38 is of the push only type so that a force is only generated when the actuator is extended and not when retracted. This ensures no crushing force is generated at potential entrapment points between the headrest and the frame, in use, when the actuator is retracted. This is a desirable safety feature of adjustable furniture.

The headrest is biased rearwards towards the frame by means of a spring to assist retraction of the headrest back to its stowed position, where it lies flat within the frame 12, as best seen in FIG. 6, In the present embodiment, a coil spring 68 is secured at one end to the distal end of the plate 66 and at the other to the cross-member 18. Thus, in use, when the actuator load is selectively removed to initiate retraction of the headrest, the spring 68 acts as a return spring and pulls the headrest rearwards as the ram is retracted. As there is no direct connection between the cam 64 and cam follower 56, only mutual abutting engagement, the headrest can be moved manually and freely if necessary, against the returning force of the spring 68, away from the seat back frame so that the user can clear any obstruction that may exist in the region between the headrest and seat back frame preventing retraction.

In order to limit the angular adjustment of the headrest 14 relative to the frame 12, stop means are provided in the form of lugs 70 on each of the mounting brackets 20. The lugs 70 extend perpendicularly from the mounting brackets towards the interior region of the frame 12. The lugs 70 prevent the headrest moving further rearwards when in the fully retracted position of FIG. 7 by mutual engagement with the respective side frame members 28 of the headrest.

Referring to the drawings of FIGS. 8 to 16, a seat back 10 for a recliner chair comprises a frame 12, adjustable lumbar support 80 and an operating mechanism for adjusting the position of the lumbar support with respect to the frame. In the drawings of FIGS. 8 to 16 the lumbar support is shown partially deployed at an intermediate position between a fully closed position (FIG. 13) and a fully open adjusted position (FIG. 14). The adjustable lumbar support may be considered to be a movable support section of the seat back 10.

The seat back 10 of FIGS. 8 to 16 is similar to the seat back of FIGS. 1 to 7, but modified to accommodate adjustable lumbar support 80 instead of the adjustable headrest 14, which the lumbar support 80 replaces. The adjustable lumbar support and its associated operating mechanism is an approximate mirror image/inversion of the adjustable headrest previously described, that is to say the operating mechanism is associated with and acts on an adjustable lumbar support in the lower part of the seat back frame instead of the adjustable headrest in the upper part of the seat back frame as in the previously described embodiment.

The frame 12, comprising planar side frame members 16, tubular cross-member 18 and mounting brackets 20, is the same as the embodiment of FIGS. 1 to 7.

The U-shape cross-section of the mounting brackets 20 provides a gap between the bottom of the bracket and the respective side frame member to accommodate a mounting pin 82 of the lumbar support 80. Mounting pins 82 rotatably mount the lumbar support with respect to the frame, between the side frame members 16, about a pivot axis defined by the pins 82.

The lumbar support 80, which may be considered to be a second furniture component, comprises a pair of planar elongate side members 84, preferably of metal, disposed on opposite lateral sides of the headrest.

The side frame members 84 are fixedly secured together by means of a tubular cross-member 86, preferably of metal construction, which extends horizontally between the side frame members 84. Cross-member 86 is fixedly attached towards the lower end of the respective side frame members 84 by welding or suitable fixing means. The lumbar support 80 further comprises adjustable mounting brackets 88 attached to the respective side frame members 84 and a profiled lumbar support panel 90. The lumbar support panel 90 has an approximate convex outward facing surface comprising three angular sections which are joined together and extend substantially horizontally between the side frame members 84. The lumbar support panel is connected to the side frame members by the respective adjustable mounting brackets 88.

The position of the lumbar support panel 90 relative to the side frame members 84 is adjustable along the length of the adjustable brackets to allow manufacturing flexibility, that is to say, when the lumbar support is being manufactured the mounting brackets 88 may be positioned and secured at one of a number of discrete mounting positions on the side frame members 84, as determined by registration mounting holes 92 in brackets 88, through which suitable fixing means pass to secure the mounting brackets 88 to the respective side frame members 84 at an appropriate position along the length of the brackets.

An electrical linear actuator 38' is provided for moving the lumbar support 80 with respect to the frame 12 about its pivot axis. The actuator is of a known type having a low voltage DC motor 40, a gearbox 42, mounting clevis 44, outer tube or snout 46 and extendable ram 48. The actuator 38 is fixedly secured to the cross-member 18 by means of a rigid generally rectangular mounting plate 50', preferably of metal construction, and first and second actuator mounting brackets 52', 54' which fixedly secure the actuator to the mounting plate. The first mounting bracket 52' secures the motor end of the actuator to the mounting plate at clevis 44'. The second mounting bracket 54' secures the snout 46 of the actuator to the mounting plate in the region adjacent the cross-member 18. The second mounting bracket clamps the snout 46 of the actuator to the mounting plate. This ensures there is no operational movement of the actuator other than the ram in use. The actuator 38 is not free to rotate on its mountings 52', 54'.

The distal end of the ram is provided with a cam follower 56' in the form of two adjacent roller bearings 58' rotatably mounted on a common shaft or pin 60' secured to a clevis mounting 62 at the distal end of the ram 48. The cam follower engages a cam 64' in the form of a metal plate 66' which extends downward and forwards from the front of the cross-member 86, best seen in FIG. 12. The angle of the metal plate 66' with respect to the notional plane of the lumbar support 80 is determined by the amount of lumbar support adjustment required per unit of extension of the actuator ram. That is to say the angle of the plate 66', with respect to the notional plane of the lumbar support, determines the gearing of the actuator and operating mechanism of the lumbar support. A shallow angle would provide low gearing. A higher angle, but less than 90 degrees, would provide high gearing.

It is to be understood that as the actuator 38' is extended, in use, the cam follower rollers 58' engage the forward facing surface of the angled cam plate 66' and cause the lumbar support 80 to rotate about its pivot axis form its retracted position of FIG. 15 to is fully extended position of FIG. 16. The maximum angle of adjustment of the lumbar support about its pivot axis is typically 10-30 degrees, for example.

It is preferred that actuator 38 is of the push only type so that a force is only generated when the actuator is extended and not when retracted.

The lumbar support 80 is biased rearwards towards the frame by means of a spring to assist retraction of the lumbar support back to its stowed position, where it lies flat within the frame 12, as best seen in FIG. 15, In the present embodiment, a coil spring 68' is secured at one end to the distal end of the plate 66' and at the other to the cross-member 18. Thus, in use, when the actuator load is selectively removed to initiate retraction of the lumbar support 80, the spring 68' acts as a return spring and pulls the lumbar support rearwards as the ram is retracted. There is no direct connection between the cam 64' and cam follower 56', only mutual abutting engagement.

In order to limit the angular adjustment of the lumbar support 14 relative to the frame 12, stop means are provided in the form of lugs 92 on each of the mounting brackets 20. The lugs 92 extend perpendicularly from the mounting brackets towards the interior region of the frame 12. The lugs 92 prevent the lumbar support moving further rearwards when in the fully retracted position of FIG. 15 by mutual engagement with the respective side frame members 86 of the lumbar support.

The mounting plate 50' extends on both sides of the cross-member 18 and includes a wide portion 94 above the cross-member 18 and a narrow portion 96 below, as can be best seen in FIG. 13. The narrow portion 96 comprises a tapered end of the plate 66' and has a flat rearward facing surface 98 which accommodates a roller 100 coaxially mounted on pin 60' between rollers 58' at the distal end of the actuator. The roller 100 has a diameter slightly greater than that of the rollers 58' and bears against the surface 98. The narrow portion 96 of the plate 50' supports the distal end of the actuator 38 in operation when lateral forces are applied to the distal end of the actuator, in use, by reaction forces acting on the lumbar support 80.

In order to accommodate the roller 100, the cam plate 66' is provided with a central cut out region 102 along part of its length. This allows the roller 100 free movement along the length of the cam plate 66' as the actuator is extended and retracted.

Referring now to the drawings of FIGS. 17 to 21, in a third embodiment the seat back 10 comprises both the adjustable head rest 14 of FIGS. 1 to 7 and the adjustable lumbar support 80 of FIGS. 8 to 16. In the third embodiment, the seat back 10 comprises frame 12, adjustable headrest 14 and operating mechanism for adjusting the position of the headrest with respect to the frame, adjustable lumbar support 80 and operating mechanism for adjusting the position of the lumbar support with respect to the frame. In the drawings of FIGS. 17 to 19 the headrest and lumbar support are shown deployed, in the drawings of FIGS. 20 and 21 the same are shown in their closed/retracted positions.

In the embodiment of FIGS. 17 to 21, actuators 38 and 38' for the adjustable headrest 14 and adjustable lumbar support 80 are arranged side by side on the cross-member 18 for independent control of the headrest adjustment and the lumbar support adjustment. As can be seen in the drawings, actuator 38' for the lumbar support is arranged on the right hand side of actuator 38 for the headrest adjustment, when viewed in the front elevation view of FIG. 21. The remaining parts of the seat back are as previously described.

It is to be understood that in all embodiments the cam followers (rollers 58, 58') engage the cam plate 66, 66' when the actuator is extended from the fully retracted position. In preferred embodiments, the rollers 58, 58' do not engage/contact the cam plate 66, 66' when actuator 38, 38' is fully retracted, the rollers and cam plate are disengaged in this configuration.

It will be understood that while the illustrated embodiments of FIGS. 1 to 21 concern a seat back suitable for a chair, preferably a recliner chair, the present invention also contemplates embodiments wherein the article of furniture is an adjustable bed, for example a bed having a recliner function in which the seat back or back rest is angularly adjustable relative to an adjacent section of the bed. In this respect it is to be understood that the term seat back used herein concerns not only seat backs for recliner chairs and the like but also backrests in beds etc, where adjustable lumbar and/or headrest support is commonly found.

The invention claimed is:

1. An adjustable seat back for an article of furniture, comprising:
a frame;
a support member pivotally mounted upon said frame for undergoing angular movement with respect to said frame between fully extended and fully retracted positions;
one of a cam or a cam follower fixedly connected to said support member;
an actuator connected to said frame;
the other one of said cam or cam follower fixedly connected to said actuator, and separate and apart from said cam or cam follower so as not to be fastened to said cam or cam follower but which is constantly engaged with said cam or cam follower such that when said actuator is extended, said cam or cam follower will cause said cam or cam follower to cause said support member to be moved toward said fully extended position, while when said actuator is retracted, said cam or cam follower will follow said cam or cam follower so as to permit said support member to return toward said fully retracted position.

2. The adjustable seat back as set forth in claim 1, further comprising:
a biasing member connected at one end thereof to said frame and at an opposite end thereof to said cam or cam follower so as to constantly bias said cam or cam follower into engagement with said cam or cam follower.

3. A seat back as claimed in claim 1, wherein:
said cam is associated with said movable support section and said cam follower is associated with said frame.

4. A seat back as claimed in claim 3 wherein:
said cam is fixed in relation to said at least one movable support section.

5. A seat back as claimed in claim 3 wherein:
said cam follower is movably mounted on or with respect to said frame.

6. A seat back as claimed in claim 1, wherein:
said cam comprises a guide ramp.

7. A seat back as claimed in claim 6, wherein:
the guide ramp comprises an inclined guide.

8. A seat back as claimed in claim 7, wherein:
the guide ramp has an angle of inclination in the range of 20 to 45 degrees, preferably 25 to 35 degrees, most preferably 30 degrees+1-1 degree.

9. A seat back as claimed in claim 7 wherein:
the guide ramp is linear.

10. A seat back claimed in claim 1, wherein:
said cam follower is fixed in relation to a moving part of said actuator.

11. A seat back as claimed in claim 1, wherein:
said actuator comprises a linear actuator arranged to move said cam follower in the longitudinal direction of the frame.

12. A seat back as claimed in claim 1, wherein:
said at least one movable support section is pivotally mounted for angular adjustment with respect to said frame.

13. A seat back as claimed in claim 1, wherein:
said at least one movable support section comprises an adjustable lumbar support.

14. A seat back as claimed in claim 1, wherein:
said at least one movable support section comprises an adjustable head rest.

15. A seat back as claimed in claim 1, wherein:
said at least one movable support section comprises an adjustable lumbar support and an adjustable head rest.

16. A seat back as claimed in claim 15 wherein:
said actuator comprises first and second actuators, said first actuator for independent movement of said adjustable head rest, and said second actuator for independent movement of said adjustable lumbar support.

17. A seat back as claimed in claim 16, wherein:
said first and second actuators are arranged side by side on said seat back frame.

18. A seat back as claimed in claim 1, wherein:
said frame comprises first and second spaced apart parallel side frame members.

19. A seatback for an article of adjustable furniture comprising;
a frame;
at least one movable support section pivotally mounted with respect to said frame;
a cam follower operatively associated with said movable support section, and a cam operatively associated with said frame;
an actuator for moving said cam, operatively associated with said frame, with respect to the said cam follower wherein said cam and cam follower are constantly engaged with each other but are not fastened together;
whereby movement of said actuator effects relative movement of said cam with respect to said cam follower and said relative movement effects angular adjustment of said movable support section relative to said frame so as to adjust the configuration of said seat back.

20. A seatback for an article of adjustable furniture according to claim 19, wherein:

said movable support section is mounted upon and pivotally movable about a fixed point upon said frame.

21. A seatback for an article of adjustable furniture according to claim 19, wherein:

said cam is provided upon a distal end of a ram of said actuator.

* * * * *